INVENTOR.
H.W. PARKER

July 17, 1962 H. W. PARKER 3,044,859
CONVERSION OF OIL SHALE TO CARBON BLACK
Filed June 16, 1960 3 Sheets-Sheet 3

INVENTOR.
H.W. PARKER
BY Hudson & Young
ATTORNEYS

United States Patent Office 3,044,859
Patented July 17, 1962

3,044,859
CONVERSION OF OIL SHALE TO CARBON BLACK
Harry W. Parker, Bartlesville, Okla., assignor to Phillips Petroleum Company, a corporation of Delaware
Filed June 16, 1960, Ser. No. 36,512
8 Claims. (Cl. 23—209.4)

This invention relates to the production of carbon black from oil shale. In one aspect, it relates to the production of carbon black from oil shale in a direct manner. In another aspect, it relates to the production of carbon black from oil shale in which operation gases, which usually are wasted, are utilized and other economies in the use of normally wasted heat are employed.

Heat is required for the production of oil from oil shale. When oil is converted to furnace carbon black, large quantities of combustible gases are produced in the carbon black furnace. If these two operations are carried out at widely separated locations, very large amounts of heat and useful gases are wasted.

An object of this invention is to combine the operation of shale oil production from oil shale with the production of furnace carbon black into a unitary operation with a minimum loss of normally wasted heat and gases. Such a combined operation markedly increases overall plant efficiency and accordingly reduces the cost of the final carbon black product.

Other objects and advantages of this invention will be realized upon reading the following description which, taken with the attached drawing, forms a part of this specification.

This invention is directed specifically to a method for producing carbon black from the carbonaceous matter of an oil shale involving heating an oil shale feed to a carbonaceous matter vaporizing temperature and thereby vaporizing carbonaceous matter from the oil shale, charging the vaporous carbonaceous matter as reactant feed to a furnace carbon black production zone and therein heating the charge carbonaceous matter under carbon black producing conditions, withdrawing gaseous effluent containing carbon black in suspension from said zone, separating carbon black from the gases of the withdrawn effluent, introducing a portion of the separated gases into a combustion zone, injecting air into this latter zone and burning the introduced gases to produce hot combustion gas, contacting in heat exchange said hot combustion gas with raw charge shale thereby preheating same and producing the aforementioned oil shale feed, and withdrawing the separated carbon black as a product of the operation.

Figure 1:
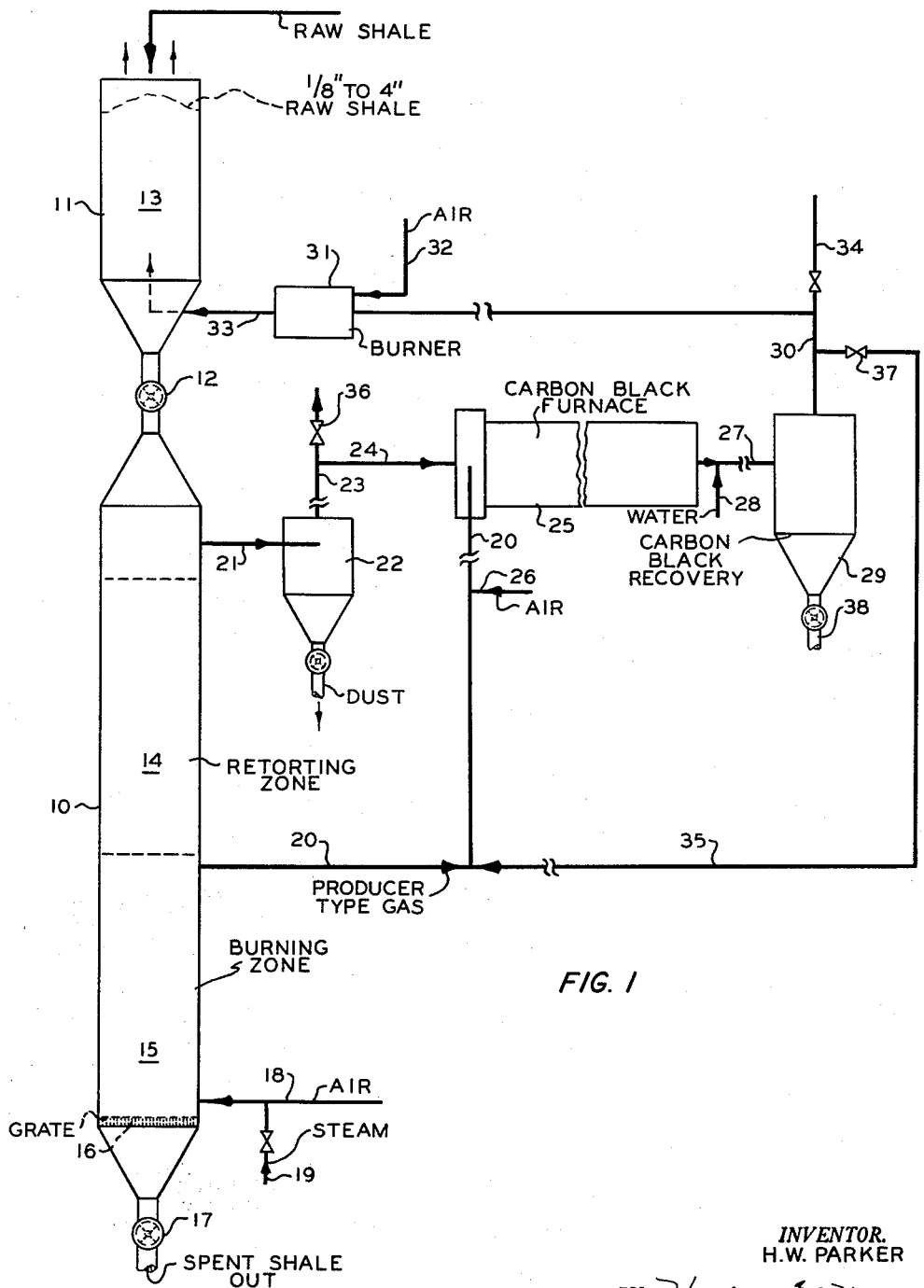
Figure 2:
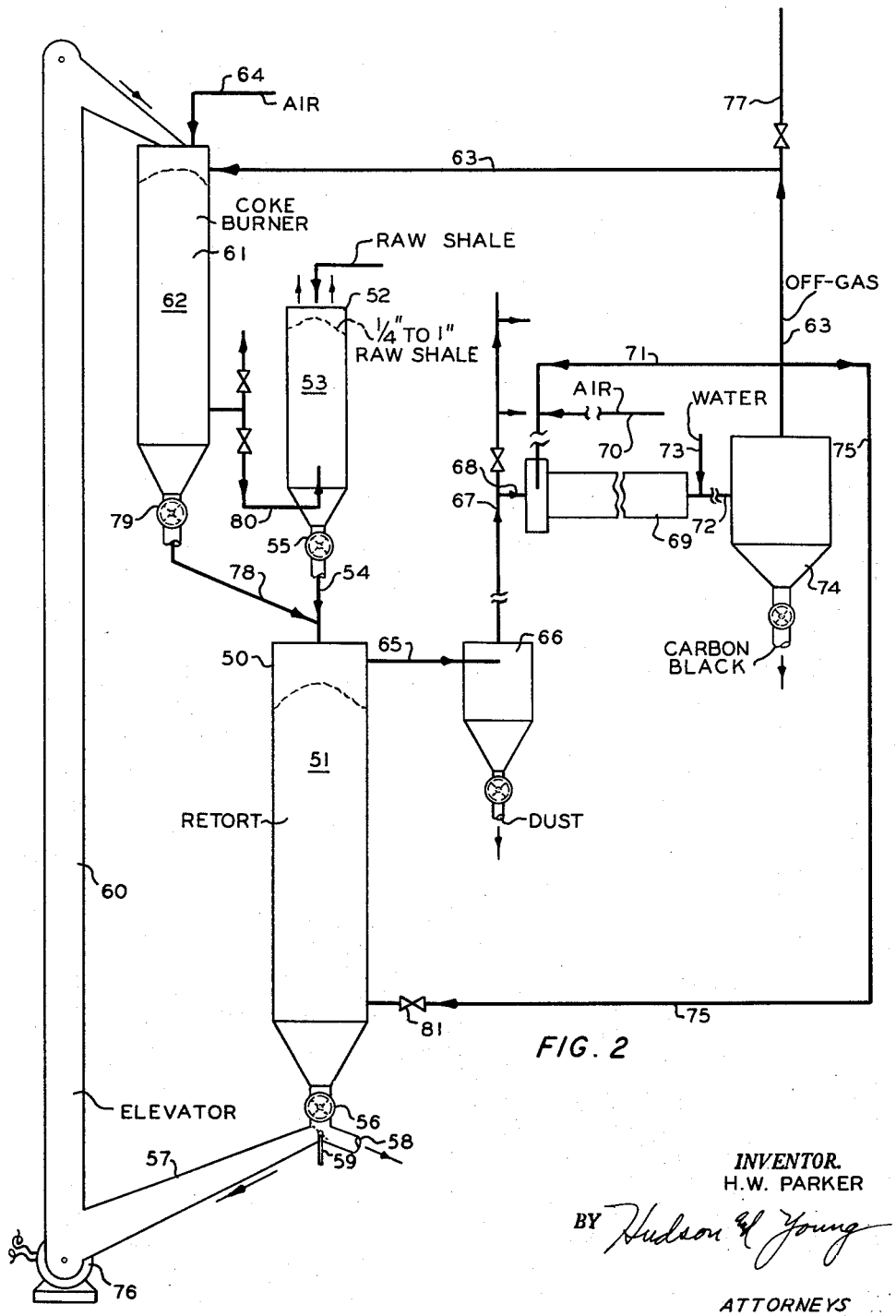
Figures 3, 4, 5:
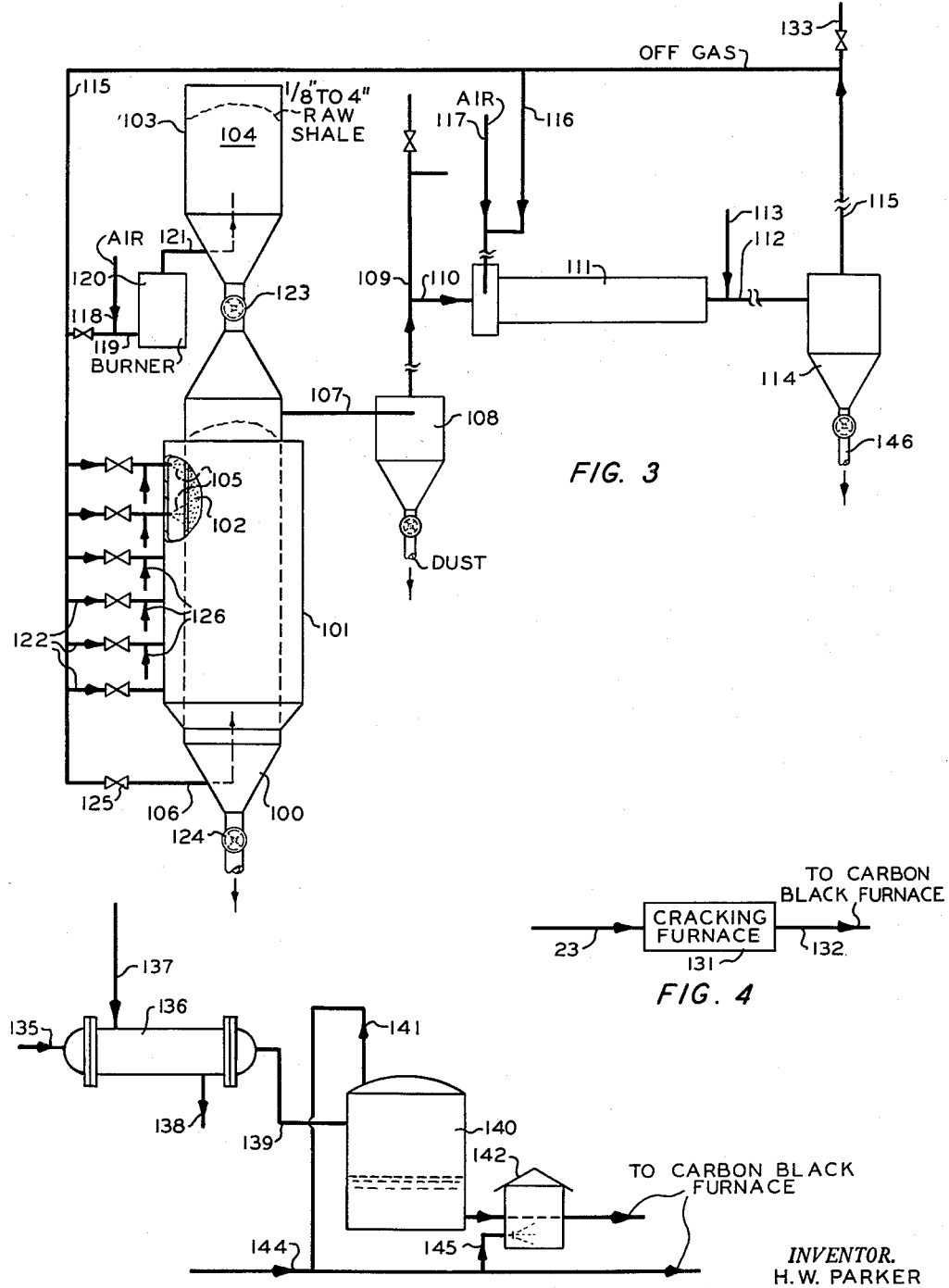

In the drawing, FIGURE 1 illustrates, in diagrammatic form, one arrangement of apparatus parts for carrying out the process of this invention. FIGURE 2 illustrates, in diagrammatic form, another arrangement of apparatus parts for carrying out an alternate embodiment of this invention. FIGURE 3 illustrates still another arrangement of apparatus parts for carrying out still another embodiment of this invention. FIGURE 4 illustrates an embodiment of apparatus which is inserted into the operation of each of FIGURES 1, 2 and 3 to provide an additional step therein. FIGURE 5 illustrates another embodiment of apparatus providing a further additional step in the apparatus of FIGURES 1, 2 and 3.

Referring to the drawing, and specifically to FIGURE 1, reference numeral 10 identifies a shale oil retort which is provided with a retorting zone 14 and a burning zone 15. At the bottom end of the burning zone 15 is a grate 16 for support of material in the retort. Above the upper or feed end of the retort is a feed hopper 11 which communicates with the retort by way of a star valve 12. Raw crushed shale 13 from the feed hopper 11 is fed at a predetermined rate by star valve 12 into the retorting zone 14. In burning zone 15, nonvolatile carbonaceous matter is burned from the mineral matter of the shale by air introduced through a pipe 18 with or without steam from pipe 19. Hot gases of combustion from the burning zone 15 pass upwardly through the retorting zone 14 and vaporize the volatile carbonaceous matter from the mineral matter of the shale. This volatile matter and combustion gases pass from the retort 10 through a pipe 21 to a cyclone separator 22. This separator is intended to remove dust and other solid and/or mineral matter from the effluent oil vapors from pipe 21. Oil vapors and gases free from solid material leave the separator through a pipe 23 and pass through a pipe 24 to a carbon black production furnace 25. In this carbon black production furnace carbon black is produced from the carbonaceous vaporous material, and effluent gases with entrained carbon leave the furnace through a pipe 27 for subsequent treatment or separation of the carbon black.

The air introduced into the burning zone 15 of the retort through pipe 18 is insufficient for complete combustion of oil or of carbonaceous matter from the mineral matter of the shale so that the gases produced in this zone are combustible gases. At least a portion of these gases is withdrawn from the burning zone through a pipe 20 and introduced tangentially into a burning or combustion zone of the carbon black furnace 25. The operation of this carbon black furnace is described in U.S. Patent 2,564,700, and in U.S. Patent 2,794,710. Briefly speaking, this furnace is operated by merely injecting hot vaporous feed oil from pipe 24 axially into the furnace. The furnace is heated by combustible gases mixed with air entering the furnace tangentially through the pipe 20. The gases so entering this furnace swirl or flow in a spiral fashion from the periphery of the combustion section toward the axis thereof and then flow helically through the main or reaction part of furnace. On passing through this portion of the furnace, carbon of the carbonaceous oil feed is reduced to carbon black and effluent gases from the furnace containing carbon black in suspension leave the furnace by way of pipe 27. Ordinarily, a water sprays 28 cools the furnace effluent to prevent further or undesired reaction and to cool the gases for subsequent recovery of the carbon black. From pipe 27, the furnace effluent gases containing carbon black in suspension enter a carbon black recovery zone 29. This recovery zone can be any means suitable for the recovery of carbon black from suspending gases, such as, an electroprecipitator, bag filter, or any other suitable means for separation and recovery of the carbon black from the suspending gases. The separated carbon black leaves the recovery system through a valved pipe 38 for such disposal as desired. Since the effluent gases from the carbon black furnace and thus from the separator 29 contain such combustible material as hydrogen and carbon monoxide, they are suitable for further use as a fuel gas. This gas is withdrawn from separator 29 through a pipe 30 and at least a portion of the gas is passed onto a burner 31. Into this burner, air is introduced through a pipe 32 for supporting combustion and the hot combustion gases are passed through a pipe 33 into the lower portion of the feed hopper 11. In this feed hopper, these hot gases preheat the shale to a temperature of from, for example, 300° to 400° F. This preheating of the shale removes a considerable heating load from the retorting zone 14.

In case an insufficient amount of combustible gas is available at the top or upper portion of the burning zone 15 for use in the tangential burner of the carbon black furnace a portion of the combustible gas leaving the carbon black recovery unit 29 is withdrawn through pipe 35 with valve 37 being opened. This gas from pipe 35, combined with gas available from pipe 20, provides ample fuel gas for heating the furnace. Air for supporting combustion of gas from pipe 20, or the combined gases from pipes 20 and 35, is introduced by way of a pipe 26 as illustrated.

The gases produced in the burning zone 15 are hot gases and these gases not used in the furnace 25 pass upward through the retorting zone 14 as a stripping gas to strip or otherwise volatilize the volatile carbonaceous matter from the mineral matter of the shale. A star valve 17 regulates the removal of the spent shale from the bottom of the burning zone 15. Any combustible gas in pipe 30 not required for preheating the raw shale or for supplementing fuel gas to the carbon black furnace is removed from pipe 30 by way of the pipe 34 for such other use as desired. The above referred to patents disclose that from 50 to 225 gallons of oil per hour are fed to such carbon black furnaces as furnace 25. In case the retort 10 provides larger volumes of oil than that mentioned for supplying feed to a single carbon black furnace additional furnaces similar to furnace 25 are provided and are connected to pipe 23 as a manifold pipe by feed pipes corresponding to feed pipe 24. In such case, valve 36 is opened for allowing the volatile carbonaceous feed to flow to the several additional furnaces.

In FIGURE 2, the main difference over the embodiment illustrated in FIGURE 1 is that hot mineral residue from the shale retort is used to supply heat to the retort for vaporization of oil from the shale. In this embodiment, raw shale is introduced into a feed hopper 52, the raw shale being identified by reference numeral 53. This raw shale is fed by a star valve 55 through a pipe 54 into a retort 50 for distillation or vaporization of the volatile carbonaceous material. Thoroughly preheated shale residue material from a spent shale burner 61 is passed through a star valve 79 and a pipe 78 and is mixed with the downflowing raw shale in pipe 54. This heated spent shale in pipe 78 has a temperature of about 1300° F. which is considerably higher than the vaporizing temperature maintained in retort 50. Thus, the spent shale in pipe 78 is actually superheated and when mixed with the raw shale in pipe 54, which has been preheated to some extent, heats the raw shale to a temperature suitable for distillation of carbonaceous matter. Gases from a carbon black separator 74, to be mentioned hereinafter, are passed from the separator through a pipe 75, with valve 81 being opened, into the retort 50 to serve as a stripping or carrier gas. This gas with its load of entrained volatile matter leaves the retort through a pipe 65 to a cyclone separator 66 for removal of dust. Gases and vaporous material, freed of dust, leave separator 66 through a pipe 67 and pass through a pipe 68 into a carbon black furnace 69. Fuel gas for heating this furnace also is obtained from the carbon black separator 74 and is passed through a pipe 71 and admixed with air from pipe 70. The mixture passes tangentially into the combustion zone of the carbon black furnace 69. This furnace is operated in a manner similar to that mentioned above relative to the furnace of FIGURE 1. The effluent gases from this furnace containing carbon black in suspension are removed from the furnace through a pipe 72 and are cooled or quenched by water from pipe 73 to prevent further or undesired reaction. The cooled gases and carbon black are passed into the carbon black separator 74. This separator can be an electrostatic separator, bag filter or any other suitable means for separating carbon black from the furnace gases.

Residual shale less its content of volatile carbonaceous matter leaves retort 50 by way of a star valve 56 and at least a portion thereof is divided from the main stream by a divider valve 59 and flows through a conduit 57 to the boot of an elevator 60. This elevator can be a screw conveyor or any other suitable means for elevating hot materials from the bottom of retort 50. Motor 76 is illustrated as providing power for operation of the elevator 60. The elevated spent shale containing some nonvolatile carbonaceous matter is introduced from the top of the elevator into the spent shale burner 61. The shale in this burner is identified by reference numeral 62. A portion of the combustible gases from the carbon black separator 74 passes from the top thereof through pipe 63 into the top of the spent shale burner 61. Air for supporting combustion of this gas and the carbonaceous matter on the spent shale enters the top of the shale burner through a pipe 64. This burning gas heats the spent shale to combustion temperature of the nonvolatile carbonaceous matter and this latter carbonaceous matter also burns to heat further the shale. Thus, by the time the mineral matter reaches the bottom of the shale burner 61, the shale is quite hot. This heated shale as mentioned hereinbefore has a temperature of about 1300° F. and this heated material is withdrawn from vessel 61 by a star valve 79 and flows through pipe 78 for admixture with the shale entering the retort. Hot gases from the bottom of the spent shale burner 61 leave the burner through a pipe 80 and are passed into the raw shale feed hopper 52 for preheating the raw shale to a temperature of from about 300° to 400° F.

The spent shale from retort 50 containing nonvolatile carbonaceous residue not required for use in heating the raw shale to a vaporization temperature is withdrawn from the bottom of the retort through a pipe 58 for such disposal as desired. Combustible gas withdrawn from the carbon black separator 74 not required for heating the carbon black furnace, or use as stripping gas in the retort, or for assisting in preheating the spent shale mineral matter is withdrawn from the system through a pipe 77 for such disposal as desired. Valve 81 in pipe 75 regulates the rate of flow of fuel gas as stripping gas into the retort 50.

In case it is desired to provide a retort heated by indirect heat exchange, the apparatus of FIGURE 3 can be used. In this figure, a retort 100 is enclosed within a jacket 101. A plurality of fuel burners 105 is provided in this jacket as illustrated. A plurality of pipes 122 connect these several burners 105 with a manifold pipe 115 for supplying fuel gas to the burners. Raw shale 104 from feed hopper 103 is fed at a predetermined feed rate through a star valve 123 into the retort 100. A small volume of gas from manifold pipe 115 can be passed through a pipe 106 into the bottom of the retort as a stripping gas by opening valve 125. This upward flowing gas assists in stripping or removing or otherwise carrying the vaporous material from the shale upward through the retort and out through a pipe 107. Air for supporting combustion of the gas in burners 105 is provided through pipes 126. Vaporous material and stripping gas from pipe 107 is passed into a cyclone dust separator 108 in which the dust is removed from these gases and vapors. Gases and vapors freed of their load of dust are passed from the separator 108 through a pipe 109 and through a feed pipe 110 into a carbon black reactor furnace 111. A combustible gas for heating this furnace enters through a pipe 116 and is admixed with air from a pipe 117 for supporting combustion thereof. This combustible mixture then is injected tangentially into the combustion chamber of the furnace 111. This carbon black furnace 111 is also fully described in the above-identified patents and its operation is similar to the furnaces 69 and 25 of FIGURES 2 and 1, respectively. Effluent gases containing carbon black in suspension are cooled by water injection from a pipe 113 and these cooled gases and carbon black are transported through a pipe 112 to a carbon black separator 114. This separator also can be any suitable type of separator desired as for example an electrostatic separator or bag filters or other suitable type of separator. The separated carbon black is removed through a valved pipe 146 while the gases freed of their load of carbon black are removed through pipe 115 for use in the process. Fuel gas not required in the process and separated from carbon black in separator 114 is removed from the system through a pipe 133 for such use or disposal as desired.

I also provide means in this embodiment of the invention for preheating the raw shale prior to its entrance into the retort proper. Apparatus for this preheating operation involves a pipe 119 for withdrawal of a portion of the fuel gas from pipe 115 and passage into a burner 120. Air for supporting this portion of the gas enters pipe 119 through pipe 118. In burner 120, this gas burns to provide combustion gases of high temperature and these gases leave burner 120 through a pipe 121 for passage into the body of raw feed shale 104. This shale is preheated to a temperature of about 300° to 400° F. by this means.

As is known in the furnace carbon black production industry and particularly where the reactant feed for the production of carbon black is an oil, a high concentration of aromatic hydrocarbons in the feed oil is desirable. A high concentration of aromatic materials provides not only a high yield of carbon black per gallon of oil feed but the carbon black is of a superior quality. FIGURE 4 illustrates, diagrammatically, a cracking furnace suitable for use in the operations illustrated in FIGURES 1, 2 and 3. In FIGURE 1, for example, this furnace is attached to pipe 23 at the break in the pipe illustrated in FIGURE 1 in such a manner that the gases from the cyclone separator 22 pass into the cracking furnace in which they are heated to a suitable cracking temperature for increasing their aromatic content. The furnace is identified in FIGURE 4 by reference numeral 131 and a pipe 132 leads the cracked gases from the furnace to branch pipe 24 to one or more carbon black furnaces.

Furthermore, in case the combustible gases separated in the carbon black separators 29, 74 and 114, are not sufficient in volume to supply sufficient heat to the carbon furnace along with other uses of the gases an embodiment illustrated in FIGURE 5 is useful. In this embodiment, the retort gases, freed of solid material in the cyclone separator, are passed through a pipe 135 of FIGURE 1 into a condenser 136. This condenser can be operated by pipe 135 of FIGURE 1 into a condenser 136. This condenser can be operated by plant cooling water or such other coolant as desired. The coolant enters the condenser through a pipe 137 and leaves through a pipe 138. Condensate and uncondensed gases leave condenser 136 through a pipe 139 and enter a separator tank 140. Uncondensed gases leave this separator tank through a pipe 141 and are combined with gases in pipe 144 for passage to the tangential burners of the carbon black furnace. Fuel gases entering through pipe 144, not originating in separator tank 140, are those originating in the carbon black separators. Liquid separated in separator 140 flows through a vaporizing heater 142 for changing the liquid to a vaporous feed for introducing into the carbon black furnace as reactant feed. A portion of the fuel gas flowing through pipe 144 is passed through pipe 145 for firing the heater 142. In this manner, the yield of carbon black per gallon of charged material from the shale oil retort is improved because the gases or normally gaseous material are separated from the condensible oil portion of the shale oil.

In Table I are given temperatures at several process points of each of FIGURES 1, 2 and 3. For example, the raw shale outlet of the several feed hoppers 11, 52, and 103 is from 300° to 400° F. The temperature of the vaporized carbonaceous material leaves the retort of FIGURE 1 through pipe 21 at a temperature of about 1,000° F. This material becomes cooled somewhat in the separator 22 and leaves this separator at a temperature of about 900° F. At this temperature, all material is in vaporous form and preheating prior to induction into the carbon black furnace is, of course, not required. The temperature of the hot gases from burner 31 passing through pipe 33 into the feed hopper 11 has a temperature of about 1200° F. in FIGURE 1. Temperature of the spent shale at the outlet valve 17 is from 200° to 250° F.

TABLE I

*Temperatures*

| Figure 1 | | Figure 2 | | Figure 3 | |
|---|---|---|---|---|---|
| App. Part, outlets | °F. | App. Part, outlets | °F. | App. Part, outlets | °F. |
| 11 | 300–400 | 52 | 300–400 | 123 | 300–400 |
| 21 | 1,000 | 65 | 1,000 | 107 | 800–900 |
| 23, 24 | 900 | 67, 68 | 900 | | |
| 33 | 1,200 | 80 | 1,300–1,400 | | |
| 17 | 200–250 | 56 | 900 | | |
| | | 78 | 1,300 | | |

In Table II, composition of the retort effluents passing through pipes 21, 65, and 107 of FIGURES 1, 2 and 3, respectively, are given.

TABLE II

| Composition, Mole Percent | Pipe 21 | Pipe 65 [1] | Pipe 107 [2] |
|---|---|---|---|
| $N_2$ | 60 | | |
| CO | 5 | 5 | 5 |
| $CO_2$ | 30 | 37 | 37 |
| $H_2$ | 2 | 18 | 18 |
| Hydrocarbons | 3 | | |
| $CH_4$ | | 17 | 17 |
| $C_2H_6$ | | 6 | 6 |
| $C_3+$ | | 17 | 17 |
| Vol. Cu. Ft. per 42-gal. bbl. of shale oil | 20,000 | 500 | 500 |

[1] Composition with valve 81 closed.
[2] Composition with valve 125 closed.

In Table III are given representative analyses of shale oils from various sources. In this table are the API gravities and the volume percents of saturated compounds, olefinic compounds and aromatic compounds. The approximate retorting temperature is also given. It is noted from this table that the aromatic compound content of the various shale oils varies markedly from a low of 19 percent to a high of about 64 percent. It would undoubtedly be advantageous when producing carbon black from such shale oils as those containing 19 percent of aromatic compounds or such low aromatic compound contents to employ the cracking apparatus illustrated in FIGURE 4 for increasing the aromatic content prior to the production of carbon black.

TABLE III

| Shale Oil API° | Distillates Boiling to 600° F. | | | Retorting Temp., °F. |
|---|---|---|---|---|
| | Sat. Comp. | Olefin Comp. | Arom. Comp. | |
| 25.6 | 51 | 27 | 22 | About 900. |
| 24.7 | 35 | 44 | 21 | Do. |
| 27.9 | 42 | 39 | 19 | Do. |
| 13.3 | 12 | 24 | 64 | Do. |
| 43.4 | 51 | 27 | 22 | Do. |
| 30.4 | 42 | 39 | 19 | Do. |
| 20.5 | 33 | 36 | 31 | Do. |
| 21.5 | 30 | 32 | 38 | Do. |
| 16.0 | 25 | 20 | 55 | Do. |
| 24.3 | 31 | 44 | 25 | Do. |
| 19.1 | 36 | 36 | 28 | [1] 1,200. |
| 16.5 | 10 | 36 | 54 | [1] 1,500. |

[1] Shale rapidly heated.

The conditions for operation of the cracking furnace 131 of FIGURE 4 can be selected to give the optimum increase in aromatic compound content without undue gas formation. The operation of cracking furnaces for the production of aromatic compounds is well understood by those skilled in the art.

As a more specific example of the operation of an embodiment of this invention and based on an oil shale yielding 30 gallons oil per ton of raw shale from about 1.67 tons to 7.5 tons of shale per hour provide from 30 to 225 gallons per hour of feed oil. The above-referred to patents which describe fully the operation of carbon black furnaces, disclosures of those patents state that from 50–225 gallons per hour of feed oil are fed to such a carbon black furnace. Thus, the 1.67 to 7½ tons of shale per hour are required to provide oil for the operation of a single carbon black furnace. For a 10 furnace plant, from 16.7 to 75 tons of shale per hour are thus required for supplying oil feed thereto. Such oil when fed to carbon black furnaces of the above-mentioned patents yield from 3 to 4 pounds of carbon black per gallon of oil. Carbon black produced in the furnaces disclosed in said patents possesses very extraordinary properties as fully described in said patents.

Valves, flow controllers, recorders, pressure gauges and controllers and other auxiliary apparatus are not illustrated in the drawing or described herein for brevity and simplification purposes. The need for such auxiliary equipment is well understood by those skilled in the art and such equipment can be supplied and installed at the needed points.

While certain embodiments of the invention have been described for illustrative purposes, the invention obviously is not limited thereto.

I claim:

1. A method for producing carbon black from the carbonaceous matter of an oil shale comprising heating an oil shale feed to a carbonaceous matter vaporizing temperature and thereby vaporizing carbonaceous matter from said oil shale feed, charging the vaporous carbonaceous matter as reactant feed to a furnace carbon black production zone and therein heating the charged carbonaceous matter under carbon black producing conditions, withdrawing gaseous effluent containing carbon black in suspension from said zone, separating carbon black from the gases of the withdrawn effluent, burning a portion of the separated gases thereby producing hot combustion gas, contacting in heat exchange said hot combustion gas with raw charge oil shale thereby preheating same and producing the aforementioned oil shale feed, introducing a stripping medium into the oil shale feed heating and vaporizing step and therein stripping vaporized carbonaceous matter from nonvaporous material, removing this stripping medium and the vaporized carbonaceous matter from the vaporizing step, and withdrawing the separated carbon black as a product of the operation.

2. A method for producing carbon black from the carbonaceous matter of an oil shale comprising heating oil shale feed to a carbonaceous matter vaporizing temperature and thereby vaporizing carbonaceous matter from said oil shale feed, charging the vaporous carbonaceous matter as reactant feed stock to a furnace carbon black production zone and therein heating the charged carbonaceous matter under carbon black producing conditions, withdrawing gaseous effluent containing carbon black in suspension from said zone, separating carbon black from the gases of the withdrawn effluent, introducing a portion of the separated gases tangentially into a combustion zone of said furnace carbon black production zone, introducing into the combustion zone a free oxygen containing combustion supporting gas with the portion of said separated gases and burning the introduced gases in said combustion zone thereby providing heat for the carbon black producing reactions in said carbon black production zone, introducing a stripping medium into the oil shale feed heating and vaporizing step and therein stripping vaporized carbonaceous matter from nonvaporous material, removing this stripping medium and the vaporized carbonaceous matter from the vaporizing step, burning another portion of the separator gases thereby producing hot combustion gas, contacting in a heat exchange step said hot combustion gas with raw charge shale thereby preheating same and producing said oil shale feed, and withdrawing the separated carbon black as a product of the operation.

3. A method for producing carbon black from the carbonaceous matter of an oil shale comprising heating an oil shale feed to a carbonaceous matter vaporizing temperature and thereby vaporizing carbonaceous matter from said oil shale feed, the vaporous carbonaceous matter containing entrained solid material, passing the vaporous carbonaceous matter and entrained solid material into a cyclonic separation zone and therein separating said solid material from entrained said vaporous carbonaceous matter, charging the vaporous carbonaceous matter from said cyclonic separation zone as reactant feed stock to a furnace carbon black production zone and therein heating the charged feed stock under carbon black producing conditions, withdrawing gaseous effluent containing carbon black in suspension from said carbon black production zone, separating carbon black from the gases of the withdrawn effluent, introducing a portion of the separated gases tangentially into a combustion zone of said furnace carbon black production zone, introducing into the combustion zone a free oxygen containing combustion supporting gas with the portion of said separated gases and burning the introduced gases in said combustion zone thereby providing heat for the carbon black producing reactions in said carbon black production zone, introducing a stripping medium into the oil shale feed heating and vaporizing step and therein stripping vaporized carbonaceous matter from nonvaporous material, removing this stripping medium and the vaporized carbonaceous matter from the vaporizing step, burning another portion of the separator gases thereby producing hot combustion gas, contacting in a heat exchange step said hot combustion gas with raw charge shale thereby preheating same and producing said oil shale feed, and withdrawing the separated carbon black as the product of the separation.

4. A method for producing carbon black from the carbonaceous matter of an oil shale comprising heating an oil shale feed stock to a carbonaceous matter vaporizing temperature and thereby vaporizing carbonaceous matter from said feed stock, charging the vaporous carbonaceous matter as reactant feed to a furnace carbon black production zone and therein heating the charged carbonaceous matter under carbon black producing conditions, withdrawing gaseous effluent containing carbon black in suspension from said zone, separating carbon black from gases of the withdrawn effluent, burning a portion of the separated gases to produce hot combustion gas, contacting in heat exchange said hot combustion gas with raw charge shale thereby preheating same and producing the aforementioned oil shale feed stock, the aforementioned vaporizing carbonaceous matter from said feed stock leaving unvaporized carbonaceous matter and mineral as a residue, to this residue adding a free oxygen containing combustion supporting gas and burning at least a portion of said unvaporized carbonaceous matter and producing hot combustion gases containing gases of incomplete combustion, passing a portion of these latter hot gases in direct contact with said oil shale feed stock thereby heating said feed stock to said carbonaceous matter vaporizing temperature, passing another portion of said latter hot gases to said carbon black production zone, supplying air with this latter portion of hot gases and burning same in the carbon black production zone thereby providing heat therefor, and removing the separated carbon black as product.

5. A method for producing carbon black from carbonaceous matter of an oil shale comprising heating an oil shale feed stock to a carbonaceous matter vaporizing temperature and thereby vaporizing carbonaceous matter from said oil shale feed leaving unvaporized carbonaceous matter and mineral matter as a residue, charging the vaporous carbonaceous matter as reactant feed to a furnace carbon black production zone and therein heating the charged vaporous matter under carbon black producing conditions, withdrawing gaseous effluent containing carbon black in suspension from said zone, separating carbon black from the gases of the withdrawn effluent, introducing a portion of the separated gases from said effluent into a combustion zone, introducing said residue into said combustion zone, also introducing a free oxygen containing combustion supporting gas into said combustion zone and therein burning at least a portion of the unvaporized carbonaceous matter of said residue and a portion of the separated gases introduced thereinto with the production of hot combustion gases whereby said residue introduced into said combustion zone becomes heated, mixing this heated residue with the aforementioned oil shale feed stock thereby producing heat for the vaporization of carbonaceous matter, passing hot gases from said combustion zone in direct heat exchange with raw oil shale thereby preheating said raw shale and providing the aforementioned oil shale feed stock, burning another portion of the separated gases from the carbon black separating operation to produce heat for maintaining said carbon black producing conditions in said carbon black production zone, passing another portion of the separated gases from the carbon black separating operation into the vaporizing operation as stripping gas, and removing the separated carbon black as product.

6. A method for producing carbon black from the carbonaceous matter of an oil shale comprising heating an oil shale feed to a carbonaceous matter vaporizing temperature and thereby vaporizing carbonaceous matter from said oil shale feed, charging the vaporous carbonaceous matter as reactant feed to a furnace carbon black production zone and therein heating the charged carbonaceous matter under carbon black producing conditions, withdrawing gaseous effluent containing carbon black in suspension from said zone, separating carbon black from the gases of the withdrawn effluent, burning a portion of the separated gases and directly heat exchanging the hot combustion gases therefrom with raw oil shale thereby producing said oil shale feed, burning another portion of said separated gases with the production of hot combustion gases and heat exchanging in an indirect heat exchange operation these latter hot combustion gases with the aforesaid oil shale feed for heating same to said carbonaceous matter vaporizing temperature, and injecting still another portion of said separated gases with air into said carbon black producing zone and therein burning said still another portion of said gases thereby producing heat for heating said charged carbonaceous matter under carbon black producing conditions in said carbon black production zone, passing still another portion of said separated gases through the step of vaporizing carbonaceous matter as a stripping agent, and removing the separated carbon black as product.

7. In the operation of the method of claim 1 heating the vaporized carbonaceous matter under aromatic hydrocarbon producing conditions thereby producing said reactant feed.

8. In the operation of the method of claim 1, cooling the vaporized carbonaceous matter under condensing conditions with the production of condensate and uncondensed gas, introducing the uncondensed gas with air into the carbon black production zone thereby providing at least a portion of the heat therefor, vaporizing said condensate and charging as said reactant feed to said furnace carbon black production zone.

References Cited in the file of this patent

UNITED STATES PATENTS

| | | |
|---|---|---|
| 2,516,134 | Molique | July 25, 1950 |
| 2,609,283 | Kalbach | Sept. 2, 1952 |
| 2,672,402 | Stokes | Mar. 16, 1954 |

UNITED STATES PATENT OFFICE
CERTIFICATE OF CORRECTION

Patent No. 3,044,859                          July 17, 1962

Harry W. Parker

It is hereby certified that error appears in the above numbered patent requiring correction and that the said Letters Patent should read as corrected below.

Column 8, line 49, after "mineral" insert -- matter --.

Signed and sealed this 20th day of November 1962.

(SEAL)
Attest:

ERNEST W. SWIDER
Attesting Officer

DAVID L. LADD
Commissioner of Patents